United States Patent [19]

Jeschke et al.

[11] Patent Number: 4,784,789

[45] Date of Patent: Nov. 15, 1988

[54] LIQUID AQUEOUS CLEANING PREPARATIONS FOR HARD SURFACES

[75] Inventors: Peter Jeschke, Neuss; Eva Kiewert, Deusseldorf; Ludwig Schieferstein, Ratingen; Klaus Schumann; Klaus-Dieter Wisotzki, both of Erkrath, all of Fed. Rep. of Germany

[73] Assignee: Henkel Kommanditgesellschaft auf Aktien, Duesseldorf, Fed. Rep. of Germany

[21] Appl. No.: 43,669

[22] Filed: Apr. 28, 1987

[30] Foreign Application Priority Data

Apr. 28, 1986 [DE] Fed. Rep. of Germany ....... 3614336

[51] Int. Cl.$^4$ .................. C11D 10/02; C11D 3/37
[52] U.S. Cl. .................. 252/174.23; 252/547; 252/558; 252/528; 252/DIG. 2; 252/DIG. 10
[58] Field of Search .................. 252/174.23, DIG. 2, 252/DIG. 10, 547, 558, 528

[56] References Cited

U.S. PATENT DOCUMENTS

| | | | |
|---|---|---|---|
| 3,696,043 | 10/1972 | Labarge et al. | 252/153 |
| 4,448,704 | 5/1984 | Barby et al. | 252/91 |
| 4,508,635 | 4/1985 | Clarke | 252/174 |
| 4,511,489 | 4/1985 | Requejo et al. | 252/172 |
| 4,539,145 | 9/1985 | Alvarez et al. | 252/542 |
| 4,678,606 | 7/1987 | Akhter et al. | 252/542 |
| 4,690,779 | 9/1987 | Baker et al. | 252/546 |

FOREIGN PATENT DOCUMENTS

| | | |
|---|---|---|
| 66342 | 12/1982 | European Pat. Off. . |
| 1073947 | 6/1967 | United Kingdom . |
| 2104091 | 3/1983 | United Kingdom . |

OTHER PUBLICATIONS

Textile Res., vol. 45, pp. 359–365, (1975).
Seifen-Oele-Fette-Wachse, 108, No. 16, p. 527, (1982).
Colloid & Polymer Science, vol. 264, pp. 56–64, (1986).

Primary Examiner—Paul Lieberman
Assistant Examiner—Ronald A. Krasnow
Attorney, Agent, or Firm—Ernest G. Szoke; Henry E. Millson, Jr.; Real J. Grandmaison

[57] ABSTRACT

A liquid cleaning preparation for hard surfaces comprising an amphoteric polymer compound containing both anionic and cationic centers in the molecular thereof. The polymer is obtained by copolymerization of a cationic vinyl monomer with an anionic vinyl polymer, and in a 0.01% solution of water having a German hardness of 16°d produces irreversible hydrophilization of polyvinyl chloride with increments in the wetting tension of at least 3 mN/m.

The preparation may contain an anionic, nonionic, cationic or amphoteric surfactant or mixtures thereof. The polymer compound is present in an amount of from about 0.01% to about 10% by weight, based on the weight of the preparation, and the surfactant is present in a weight ratio of polymer to surfactant of from about 20:1 to about 1:1.

16 Claims, No Drawings

LIQUID AQUEOUS CLEANING PREPARATIONS FOR HARD SURFACES

BACKGROUND OF THE INVENTION

1. Field of the Invention

This invention relates to liquid aqueous cleaning preparations for hard surfaces, and more particularly to such preparations for use in the home and in institutions which provide thorough cleaning and antistatic properties to surfaces which tend to develop static charges without leaving behind any visible residues.

2. Discussion of Related Art

Cleaning preparations based on surfactants with or without the addition of builders are normally used for cleaning hard surfaces both in the home and in institutions. It is known that natural or synthetic polymers may be added to such cleaning preparations to enhance their cleaning power. Thus, German Patent Applications Nos. 28 40 463 and 28 40 464 describe the use of high molecular weight polyethylene glycols, and German Patent Application No. 29 13 049 describes the use of polyvinyl alcohols, polyvinyl pyrrolidones, cellulose ethers, polysaccharides, proteins and polyacrylamides as cleaning enhancers.

According to Great Britain Patent Specification No. 1,073,947, polyacrylamides inter alia improve the soil suspending power of liquid cleaning preparations for hard and irregular-shaped surfaces.

U.S. Pat. No. 3,696,043 describes polymers of aromatic monovinyl monomers with unsaturated dicarboxylic acids, and U.S. Pat. No. 4,508,635 describes the same class of compounds, but in partially esterified form, for improving the visual residue behavior of the cleaned surfaces and for avoiding the coating by glass of remaining water vapor.

Finally, British Patent Specification No. 2,104,091 describes liquid cleaning preparations which, together with standard anionic, nonionic, cationic or amphoteric surfactants, contain an addition of an amphoteric polymer compound prepared by polymerization of a cationic vinyl monomer with an anionic vinyl monomer. This addition, which is used in small amounts compared with the surfactant, brings about an improvement in detergency.

Unfortunately, none of these known liquid cleaning preparations is able to prevent freshly cleaned plastics material from attracting dust particles from the air and thus appearing as if it has not been cleaned.

Therefore, with the increasing number of plastics surfaces in the home, it would make cleaning very much easier and more efficient if those surfaces could be antistatically finished during cleaning. It would also be of value to the consumer if one and the same cleaning preparation could be used for a wide range of applications to enable optimal effects to be obtained both on hydrophobic surfaces, i.e., antistatic effects, and also on hydrophilic surfaces, i.e., anti-coating effects.

Accordingly, an object of the present invention is to provide cleaning preparations which are suitable for cleaning all washable hard surfaces in the home and in institutions and which at the same time bring about both thorough cleaning and antistatic finishing of surfaces which tend to develop static charges, and also anti-coating effects on mirrors without leaving behind any visible residues in the form of streaks, patches or the like on the treated surfaces. With prior art polymers and their end-use formulations, it is not possible to satisfy all the above-mentioned requirements with one and the same cleaning preparation.

DESCRIPTION OF THE INVENTION

Other than in the operating examples, or where otherwise indicated, all numbers expressing quantities of ingredients or reaction conditions used herein are to be understood as modified in all instances by the term "about".

Surprisingly, it has been found that the aforementioned objects can be accomplished by using selected amphoteric copolymers which contain both anionic and cationic centers in the molecule, and are characterized by certain hydrophilization properties, together with surfactants in certain critical quantitative ratios.

It is thus a particular characteristic of the cleaning agent in accordance with this invention that, in contrast to the teaching of British Patent No. 2,104,091, it contains quantitatively less surfactant than polymer compound, and at most small quantities of surfactant and polymer compound.

The present invention pertains to liquid aqueous cleaning agents for hard surfaces which contain at least one amphoteric polymer compound obtained by copolymerizing a cationic vinyl monomer with an anionic vinyl monomer in a quantity of 0.01 to 10% by weight, as well as an anionic, nonionic, cationic or amphoteric surfactant or mixtures thereof, characterized in that the amphoteric polymer compounds with anionic and cationic centers in the molecule are selected from among polymer compounds which in 0.1% solution in water of 16°d bring about an irreversible hydrophilization of PVC with increments of the wetting tension of at least 3 milli-Newton per meter (mN/m), and wherein the surfactant quantity is selected such that the weight ratio of amphoteric polymer to surfactant is 20:1 to 1:1, preferably 10:1 to 1:1.

The amount of amphoteric polymer compound present in the cleaning preparations may be from 0.01 to 10% by weight, based on the weight of the cleaning preparation. Preferred preparations according to the invention contain the amphoteric polymer compound in quantities of from 0.02 to 5% by weight of the preparations.

Where the preparations according to the invention are applied to the hard surfaces to be cleaned, they produce not only a good antistatic effect, but also a good anti-coating effect coupled wtih good residue behavior.

It is possible to use virtually any of the surfactants and surfactant mixtures hitherto typically used for cleaning preparations of the type herein. Non-ionic surfactants of the amine oxide type containing at least one $C_{10}$–$C_{20}$ alkyl group are particularly preferred. Typical representatives include, for example, the compounds N-dodecyl-N,N-dimethylamine oxide, N-tetradecyl-N,N-dihydroxyethylamine oxide, and N-hexadecyl-N,N-bis-(2,3-dihydroxypropyl) -amine oxide.

Favorable effects are also obtained with other nonionic surfactants, for example with adducts of from 4 to 40 moles, and preferably 4 to 20 moles of ethylene oxide or ethylene oxide and propylene oxide with 1 mole of fatty alcohol, alkane diol, alkane phenol, fatty acid, fatty amine, fatty acid amide or alkane sulfonamide. Particularly useful are the adducts of from 5 to 16 moles of ethylene oxide or ethylene oxide and propylene oxide with coconut oil or tallow fatty alcohols, with oleyl alcohol or with secondary alcohols containing from 8 to 18, and preferably from 12 to 18 carbon atoms and with mono- or dialkylphenols containing from 6 to 14 carbon atoms in the alkyl groups. In addition to these water soluble nonionics, however, polyglycol ethers containing from 1 to 4 ethylene glycol ether residues in the molecule, which are insoluble or not completely soluble in water, are also useful, particularly where they are used together with water-soluble nonionic or anionic surfactants.

Other suitable nonionic surfactants include the water-soluble adducts, containing from 20 to 250 ethylene glycol ether groups and from 10 to 100 propylene glycol ether groups, of ethylene oxide with polypropylene oxide, alkylenediamine polypropylene glycol and alkyl polypropylene glycols containing from 1 to 10 carbon atoms in the alkyl chain, wherein the polypropylene glycol chain acts as a hydrophobic residue.

Anionic surfactants may also be used in this invention either individually or in combination with nonionic surfactants. It is preferred to use surfactant combinations of anionic surfactants selected from the group of sulfonate and sulfate surfactants, and nonionic surfactants of the ethoxylated alkanol, alkenol and alkylphenol type.

Suitable anionic surfactants include, for example, soaps of natural or synthetic fatty acids and of resinic or naphthenic acids. Suitable synthetic anionic surfactants include those of the sulfonate and synthetic carboxylate type.

Suitable surfactants of the sulfonate type include alkylbenzene sulfonates containing 9 to 15 carbons in the alkyl group, mixtures of alkene and hydroxyalkane sulfonates and also disulfonates, such as those obtained, for example, from monoolefins containing a terminal or internal double bond by sulfonation with gaseous sulfur trioxide and subsequent alkaline or acidic hydrolysis. Alkane sulfonates obtainable from alkanes by sulfochlorination or sulfoxidation and subsequent hydrolysis or neutralization or by addition of bisulfites onto olefins are also suitable. Other suitable surfactants of the sulfonate type include the esters of $\alpha$-sulfofatty acids, for example, the $\alpha$-sulfonic acids from hydrogenated methyl or ethyl esters of coconut oil, palm kernel oil or tallow fatty acid.

Suitable surfactants of the sulfate type include the sulfuric acid monoesters of primary alcohols, for example, from coconut oil fatty alcohols, tallow fatty alcohols or oleyl alcohol, and those of secondary alcohols. Sulfated fatty acid alkanolamides, fatty acid monoglycerides or reaction products of from 1 to 4 moles of ethylene oxide with primary or secondary fatty alcohols or alkylphenols are also suitable.

Other suitable anionic surfactants herein include the fatty acid esters of amides of hydroxy or amino-carboxylic acids or sulfonic acids, such as for example, fatty acid sarcosides, glycolates, lactates, taurides or isethionates.

The anionic surfactants may be present in the form of their alkali metal, alkaline earth and ammonium salts and as soluble salts of organic bases, such as mono-, di- or triethanolamine. The sodium salts are generally preferred for reasons of cost.

The cationic surfactants which may also be used in this invention contain at least one hydrophobic group and at least one basic, water-solubilizing group optionally present in salt form. The hydrophobic group may be an aliphatic or cycloaliphatic hydrocarbon group preferably containing from 10 to 22 carbon atoms or an aromatic alkyl or cycloalkyl group preferably containing from 8 to 16 aliphatic carbon atoms. Suitable basic groups include primarily basic nitrogen atoms which may even be repeatedly present in a surfactant molecule. The compounds herein are preferably quaternary ammonium compounds, such as for, example, N-dodecyl-N,N,N-trimethylammonium methosulfate, N-hexadecyl-or N-octadecyl-N,N,N-trimethylammonium chloride, N,N-dicocosalkyl-N,N-dimethylammonium chloride, N-dodecyl-N,N-dimethyl-N-benzylammonium bromide, the reaction product of 1 mole of tallow alkylamine with 10 moles of ethylene oxide, N-dodecyl-N,N'-trimethyl-1,3-diaminopropane, and N-hexadecyl pyridinium chloride. Where cationic surfactants are used, they should of course be tested in the customary way for their compatibility with other constituents of the formulation.

The amphoteric copolymers used in accordance with the invention include copolymers containing anionic and cationic centers in the molecule prepared in accordance with British Patent Specification No. 2,104,091 from two or three of the following monomers:

AS- acrylic acid or salts thereof,
DMAEM- dimethylaminoethyl methacrylate,
DMANA- dimethylaminoneopentyl acrylate,
DMAPMA- dimethylaminopropylmethacrylamide,
EA- ethylacrylate,
MAPTAC- methacrylamidopropyltrimethylammonium chloride,
MAS- methacrylic acid or salts thereof, and
MMA- methylmethacrylate, and which contain at least 1 mole of a nitrogen-containing acrylic acid derivative per mole of acrylic acid. The salts include the alkali metal, ammonium and/or alkanolamine salts thereof.

The measurement of the irreversible hydrophilization of plastics was achieved with the aid of wetting tension measurements as described in *Colloid and Polymer Science*, Vol. 264, pp. 56–64, (1986). The polymers in 0.01% solution in 16°d hard water were tested on PVC. The surface tension $Y_L$ in mN/m (previously known as dyn/cm, see DIN 1301) according to the equation $$j = Y_L \cdot \cos \theta (= F/P)$$

is the upper limit of the wetting tension j for $\theta \rightarrow 0$. Other values can be adopted numerically without alteration, e.g., for pure water at 25° C., $Y_L = 72$ mN/m = 72 dyn/cm.

$\theta$ in degrees is the equilibrium marginal angle measured in the liquid between a flat solid measurement piece and the tangent to the surface of the drop at the wetting point.

In the technological determination of the wetting tension j against water, a measurement is performed of the force (F) with which a measurement piece of circumference P (e.g., PCC film) is drawn into or pushed out of water. Thus the measurement value is a measure of the wettability (wetting tension j = F/P) of a measurement piece with water.

The efffective irreversible adsorption of amphoteric polymers on a test piece changes this force more or less depending on the hydrophilicity or hydrophobicity of the molecular structure.

In the case of a hydrophilization effect, the force with which the measurement piece is pulled into the water is greater than in the initial state. Thus, positive increments of the wetting tension result from this ($+\Delta j$). (In the case of a hydrophobization effect, the force with which the measurement piece is pulled into the water becomes smaller than in the initial state. Negative increments of the wetting tension ($-\Delta j$) would result from this.) (Also see B. Miller and R.A. Yound in *Textile Res. J.*, Vol. 45, pp. 359–365, 1975.)

The use of water-soluble or solution-promoting solvents is not essential to the effects obtained in accordance with the invention, although their presence can have a positive effect on the evaporation behavior of residues of the cleaning preparation on the treated surfaces. Examples of suitable solvents include linear, branched and cycloaliphatic $C_2$–$C_{12}$ alcohols and ethers of identical or different polyhydric alcohols or the partial ethers of polyhydric alcohols. Solvents such as these include, for example, di- or triethylene glycol polyglycerols and the partial ethers of ethyleneglycol, propylene glycol, butylene glycol or glycerol with aliphatic monohydric alcohols Suitable water-soluble or water-emulsifiable organic solvents also include ketones, such as acetone, methyl ethyl ketone, and also aliphatic, cycloaliphatic, aromatic and chlorinated hydrocarbons as well as the terpenes.

In addition, it is possible to incorporate solution promoters known per se, including or in addition to the water-soluble organic solvents, such as in particular low weight aliphatic $C_1$–$C_4$ alcohols, so-called hydrotropes of the lower alkylaryl sulfonate type, for example toluene, xylene or cumene sulfonate. They may also be present in the form of their sodium and/or potassium and/or alkylamino salts. The water-soluble or solution-promoting solvents may be present in quantities of from 0 to 15% by weight, and preferably in quantities of from 0 to 10% by weight, based on the preparation as a whole.

Known builders, particularly inorganic or organic complexing agents, which are preferably present in the form of their alkali metal or amine salts, particularly the potassium salts, may also be added to the cleaning preparations according to the invention in quantities of from 0 to 3% by weight and preferably in quantities of from 0 to 2% by weight, based on the preparation as a whole. The builders may also include alkali metal hydroxides. Suitable inorganic complexing builders include, in particular, the alkaline-reacting polyphosphates, particularly the tripolyphosphates, and also the pyrophosphates. They may be completely or partly replaced by organic complexing agents. Other inorganic builders which may be used in accordance with the invention include, for example, dicarbonates, carbonates, borates, silicates or orthophosphates of the alkali metals.

Organic complexing agents of the aminopolycarboxylic acid type include, inter alia, nitrilotriacetic acid, ethylenediamine tetraacetic acid, N-hydroxyethylethylene -diamine triacetic acid and polyalkylene polyamine -N-polycarboxylic acids as well as di- and polyphosphonic acids, and their alkali metal salts.

Various generally N- or P-free polycarboxylic acids have recently been proposed as builders in the literature, the compounds often, although not always, being polymers containing carboxyl groups. Many of these polycarboxylic acids are capable of complexing calcium. This is the case, for example, with citric acid, tartaric acid, benzene hexacarboxylic acid, tetrahydrofuran tetracarboxylic acid, gluconic acid, etc. Since the preparations of this invention should preferably show a neutral to mildly alkaline reaction, acidic or alkaline components may have to be added to regulate the pH-value.

Suitable acidic substances include typical inorganic or organic acids or acidic salts, such as for example, hydrochloric acid, sulfuric acid, bisulfates of the alkali metals, aminosulfonic acid, phosphoric acid or other acids of phosphorus, particularly the anhydric acids of phosphorus or acidic salts thereof or acid-reacting solid compounds thereof with urea or other lower carboxylic acid amides, partial amides for phosphorus acids or anhydric phosphoric acid, citric acid, tartaric acid, lactic acid and the like. Where the alkaline builder content is not sufficient to regulate the pH-value, alkaline-acting organic or inorganic compounds, such as alkanolamines, namely mono-, di-or triethanolamine, or ammonia may also be added.

Other additives typically used in cleaning preparations, such as for example, viscosity regulators, antimicrobial agents, dyes and perfumes, may also be present in the subject cleaning preparation providing they are compatible with the other constituents of the formulation.

The following procedures were practiced in the examples.

1. Preparation of the amphoteric polymers:
(a) Procedure for preparing a copolymer of DMA-EM:AS, molar ratio 5:1

306 g of water, 26.8 g (0.17 mole) of dimethylaminoethyl methacrylate and 2.46 g (0.034 mole) of acrylic acid were first weighed with external cooling into a 2 liter flask surmounted by a metering vessel. A pH value of approximately 6 was adjusted by addition of approximately 21 g of 30% sulfuric acid. The internal temperature of the mixture was kept below 25° C.

A solution of 346 g of water, 241.2 g (1.54 moles) of dimethylaminoethyl methacrylate, 22.5 g (0.31 mole) of acrylic acid and approximately 200 g of 30% sulfuric acid prepared as described above was introduced into the metering vessel.

The contents of the flask were then heated to a temperature of 80° C. and polymerization initiated by addition of a solution of 2.6 g of ammonium peroxydisulfate in 20 g of water.

The solution in the metering vessel was then introduced to the flask contents over a period of 1 hour. The internal temperature was kept between 78° and 83° C. by external cooling. On completion of the addition, a solution of 1.3 g of ammonium peroxydisulfate in 10 g of water was added and the mixture stirred for about 1 hour at 80° C.

A clear, yellow, moderately viscous polymer solution was obtained after cooling.

At relatively low concentrations, the reaction may even be carried out in a single stage because in that case the reaction is less exothermic. This procedure is described below.

(b) Procedure for preparing a copolymer of DMA-EM:AS:MMA, molar ratio 3:1:1

95.4 g of dimethylaminoethyl methacrylate (0.61 mole), 60.8 g of methylmethacrylate (0.61 mole), 0.7 g of azodi (isobutyronitrile) and 159 g of isopropanol were weighed into a 2 liter flask. 43.8 g of acrylic acid (0.61 mole) in 635 g of water were added with stirring. Heating beyond 22° C. was avoided by external cooling. The mixture was then carefully adjusted to a pH value of approximately 6.0 by addition of approximately 5 g of 30% sulfuric acid and was then stirred under nitrogen for 2.5 hours at 65° to 80° C. A colorless, clear, slightly viscous polymer solution was obtained after cooling.

The other substances were similarly prepared without any difficulty for the expert.

2. Test Methods

The properties of the preparations of the invention were determined by the following tests:

(a) Antistatic effects (a1) Measuring method 15 cm×15 cm plates of polyvinyl chloride (PVC), polyethylene (PE), and acrylic glass were treated with the test products, acclimatized in a control environment (20° C./65% relative humidity) and their electrical surface resistance measured using the ring electrode according to DIN 54 345, Part 1. Three plates of the same material were used for each test product. Similar plates which had been treated either only with water or with recommended prepared solutions of commercial polymer-containing cleaning preparations were used for comparison.

The measured resistance values (in ohms) of the plates treated with the cleaning preparations according to the invention were lower by several powers of 10 than the blank values and considerably more favorable than the comparison values obtained with the state-of-the-art cleaning preparation.

(a2) Qualitative test

As a rapid preliminary test, the plates were tested for their tendency to attract soot particles. The soot was prepared by burning cellulose. The plates described in (a1) which had been treated with the cleaning preparations therein and then dried were rubbed with a woolen cloth and held over the soot at a distance of 5 cm. Whereas the plates treated with the state-of-the-art cleaning preparation attracted the soot, the plates treated with the products according to the invention remained clean.

(b) Anti-coating effects 30 cm×40 cm mirrors were treated wtih the products according to the invention and, for comparison, with the state-of-the-art cleaning preparation and placed in a domestic refrigerator. After 30 minutes, the mirrors were visually assessed.

Whereas the preparations according to the invention prevented coating of the mirrors, the mirrors treated with the comparison preparation were coated.

(c) Residue behavior

Surfaces of mirror glass, glazed tiles, PVC, PE, acrylic glass and Resopal were treated as recommended with the preparations according to the invention and, for comparison, with the state-of-the-art cleaning preparation.

After the surfaces had dried, their appearance for homogeneity was visually assessed. In every case, the preparations according to the invention showed distinctly more favorable residue behavior than the comparison product.

(d) Cleaning effect

To test its cleaning effect, the cleaning preparation to be tested was applied to an artificially soiled PVC surface. A mixture of carbon black, machine oil, a saturated fatty acid trigyceride, and a low-boiling aliphatic hydrocarbon was used as the artificial soil. The 26×28 cm test area was uniformly coated with 2 g of the artificial soil using a surface spreader.

A plastic sponge was wetted with 12 ml of the cleaning preparation solution to be tested and moved by machine over the test surface. After 6 wiping movements, the cleaned test surface was held under running water and the loose soil removed. The cleaning effect, i.e. the whiteness of the plastic surface thus cleaned, was measured using an LF 90 photoelectric colorimeter (Dr. B. Lange). The clean white plastic surface served as the white standard.

Since in the measurement of the cleaned surface the colorimeter was set at 100% while the soiled surface produced a zero reading, the values read off in the case of the cleaned plastic surfaces could be equated with the percentage cleaning power (%CP). (Quality standards of the Industrieverband Putz-und Pflegemittel (IPP), published in Seifen, Ole, Fette, Wachse, 108, No. 16, page 527, (1982)).

(e) Composition of a state-of-the-art cleaning preparation

The state-of-the-art cleaning preparation comprised an aqueous solution of 7.0% by weight of a straight-chain primary $C_9$–$C_{11}$ alkanol reacted with 5 moles of ethylene oxide, 2% by weight of sodium lauryl ether sulfate, 1% by weight of a partial ester of styrene-maleic acid anhydride polymers, and 0.45% by weight of hydroxyethyl cellulose.

The following examples were prepared simply by mixing the given components. All the percentages are percentages by weight.

EXAMPLE I 0.1% cocosalkyldimethylamine oxide
0.15% amphoteric polymer DMAEM/AS (molar ratio 10:1)
4% ethanol
2% isopropanol
1% propylene glycol butylether
0.1% perfumes
ad 100% fully deionized water This cleaning preparation showed a very good anti-coating effect on mirror glass. It provided PVC and PE surfaces with an antistatic finish and left no visible residue behind on the treated surfaces. The IPP cleaning power is considerably better than that of an in-use solution of a commercial cleaning preparation for hard surfaces based on a nonionic and an anionic surfactant and a partially esterified styrenemaleic anhydride copolymer according to European Patent No. 66342.

EXAMPLES II–X

In the basic formulation of Example I, the amphoteric polymer was varied as follows:

DMAEM/AS molar ratio 1:1
DMAEM/AS molar ratio 2:1
DMAEM/AS molar ratio 5:1
DMAEM/MAS molar ratio 2:1
DMAEM/MAS molar ratio 5:1
DMAEM/AS/MMA molar ratio 1:1:1
DMAEM/AS/MMA molar ratio 3:1:1
DMAEM/AS/MMA molar ratio 5:1:1
DMAPMA/AS molar ratio 2:1

In every case, the cleaning preparation obtained could be sprayed by commercial spray pumps and produced the same favorable results as the formulation of Example I in the tests for anti-coating effect, antistatic effect, residue behavior and cleaning power.

EXAMPLES XI and XII 0.05% sec. $C_{11}$–$C_{18}$ alkane sulfonate 0.1% fatty alcohol containing 5 moles ethylene oxide and 4 moles of propylene oxide (based on coconut oil)
0.04% EDTA
7% ethanol
1% isopropanol
0.01% pine oil
0.15% polymer DMAEM/AS
ad 100% fully deionized water The molar ratio of the monomers in the polymer of Example XI was 3:1 and, in the case of Example XII, 5:1.

Both cleaners showed irreversible hydrophilicization on PVC which led to good antistatic effects and high cleaning power. The residue behavior on glass and plastic surfaces was very good.

We claim:

1. In a liquid cleaning preparation for hard surfaces comprising an amphoteric polymer compound containing both anionic and cationic centers in the molecule thereof, said polymer compound having been obtained by copolymerization of a cationic vinyl monomer with an anionic vinyl polymer which in a 0.01% solution of water having a hardness of 16°d produce irreversible hydrophilization of polyvinyl chloride with increments in the wetting tension of at least 3mN/m, and an anionic, nonionic, cationic or amphoteric surfactant or mixtures thereof, said polymer compound being present in an amount of from about 0.01% to about 10% by weight, based on the weight of said preparation, the improvement comprising said polymer being present in a weight ratio of polymer to surfactant of from about 20:1 to about 1:1.

2. A liquid cleaning preparation in accordance with claim 1 wherein said polymer compound is present therein in an amount of from about 0.02% to about 5% by weight.

3. A liquid cleaning preparation in accordance with claim 1 wherein said weight ratio of polymer to surfactant is from about 10:1 to 1:1.

4. A liquid cleaning preparation in accordance with claim 1 wherein said polymer compound contains at least 1 mole of a nitrogen containing acrylic acid derivative per 1 mole of acrylic acid.

5. A liquid cleaning preparation in accordance with claim 1 wherein said nonionic surfactant is in amine oxide containing at least one $C_{10}$–$C_{20}$ alkyl group.

6. A liquid cleaning preparation in accordance with claim 5 wherein said amine oxide is selected from the group consisting of N-dodecyl-N,N-dimethylamine oxide, N-tetradecyl-N, N-dihydroxyethylamine oxide, and hexadecyl-N,N-bis-(2,3-dihydroxypropyl)-amine oxide.

7. A liquid cleaning preparation in accordance with claim 1 wherein said nonionic surfactant is an adduct of from about 4 to about 40 moles of ethylene oxide or ethylene oxide and propylene oxide with 1 mole of fatty alcohol, alkane diol, alkane phenol, fatty acid, fatty amine, fatty acid amide or alkane sulfonamide.

8. A liquid cleaning preparation in accordance with claim 1 wherein said anionic surfactant is selected from the group consisting of sulfonate and sulfate surfactants.

9. A liquid cleaning preparation in accordance with claim 8 wherein said sulfonate surfactant comprises an alkylbenzene sulfonate containing from about 9 to about 15 carbon atoms in the alkyl group.

10. A liquid cleaning preparation in accordance with claim 8 wherein said sulfate surfactant comprises a sulfuric acid monoester of a primary alcohol.

11. A liquid cleaing preparation in accordance with claim 1 wherein said anionic surfactant comprises a fatty acid ester amide of a hydroxy or amino-carboxylic acid or sulfonic acid.

12. A liquid cleaning preparation in accordance with claim 1 wherein said cationic surfactant contains at least one hydrophobic group and at least one basic, water-solubilizing group.

13. A liquid cleaning preparation in accordance with claim 1 wherein said amphoteric polymer compound is derived from acrylic acid and salts thereof, dimethylaminoethyl methacrylate, dimethylaminoneopentyl acrylate, dimethylaminopropyl methacrylamide, ethylacrylate, methacrylamidopropyl trimethylammonium chloride, methacrylic acid and salts thereof, and methylmethacrylate.

14. A liquid cleaning preparation in accordance with claim 1 including a water-soluble or water-emulsifiable organic solvent.

15. A liquid cleaning preparation in accordance with claim 1 including from 0 to about 3% by weight of a complexing agent.

16. A liquid cleaning preparation in accordance with claim 15 wherein said complexing agent is selected from the group consisting of polyphosphate, pyrophosphate and amino polycarboxylic acid including alkali metal salts thereof.

* * * * *